United States Patent
Nakayama et al.

(10) Patent No.: US 8,187,351 B2
(45) Date of Patent: May 29, 2012

(54) SOL OF SPINOUS INORGANIC OXIDE PARTICLES, METHOD OF PRODUCING THE SOL, AND POLISHING AGENT CONTAINING THE SOL

(75) Inventors: Kazuhiro Nakayama, Kitakyushu (JP); Mami Tokunaga, Kitakyushu (JP); Akira Nakashima, Kitakyushu (JP); Kazuaki Inoue, Kitakyushu (JP); Osamu Yoshida, Kitakyushu (JP); Yoshinori Wakamiya, Kitakyushu (JP); Hiroyasu Nishida, Kitakyushu (JP)

(73) Assignee: JGC Catalysts and Chemicals Ltd., Kawasaki-Shi (JP)

( * ) Notice: Subject to any disclaimer, the term of this patent is extended or adjusted under 35 U.S.C. 154(b) by 795 days.

(21) Appl. No.: 11/987,303

(22) Filed: Nov. 29, 2007

(65) Prior Publication Data
US 2008/0131571 A1    Jun. 5, 2008

(30) Foreign Application Priority Data

Nov. 30, 2006    (JP) .................. 2006-323554

(51) Int. Cl.
| | |
|---|---|
| *B24D 3/00* | (2006.01) |
| *B24D 11/00* | (2006.01) |
| *B24D 18/00* | (2006.01) |
| *B24D 3/02* | (2006.01) |
| *C09K 3/14* | (2006.01) |
| *C09C 1/68* | (2006.01) |

(52) U.S. Cl. ................. 51/308; 51/293; 51/307; 51/309
(58) Field of Classification Search .............. 51/308, 51/293, 307, 309
See application file for complete search history.

(56) References Cited

U.S. PATENT DOCUMENTS

| | | | | |
|---|---|---|---|---|
| 4,911,903 A | * | 3/1990 | Unger et al. .................. 423/335 |
| 5,597,512 A | * | 1/1997 | Watanabe et al. ............... 516/34 |
| 2008/0086951 A1 | * | 4/2008 | Wakamiya et al. ............. 51/308 |
| 2008/0131571 A1 | * | 6/2008 | Nakayama et al. ........... 426/531 |

FOREIGN PATENT DOCUMENTS

| | | |
|---|---|---|
| JP | H01-317115 | 12/1989 |
| JP | H03-257010 | 11/1991 |
| JP | H04-065314 | 3/1992 |
| JP | H04-187512 | 7/1992 |
| JP | H07-118008 | 5/1995 |
| JP | H07-221059 | 8/1995 |
| JP | H08-279480 | 10/1996 |
| JP | H10-128121 | 5/1998 |
| JP | H11-214338 | 8/1999 |
| JP | 2001-011433 | 1/2001 |
| JP | 2001-048520 | 2/2001 |
| JP | 2001-150334 | 6/2001 |
| JP | 2001-352966 | 12/2001 |
| JP | 2002-038049 | 2/2002 |
| JP | 2003-026417 | 1/2003 |
| JP | 2003-133267 | 5/2003 |
| JP | 2004-035293 | 2/2004 |
| JP | 2004-288732 | 10/2004 |
| JP | 2004-311652 | 11/2004 |
| WO | WO0015552 | 3/2000 |

* cited by examiner

*Primary Examiner* — James McDonough
(74) *Attorney, Agent, or Firm* — Manabu Kanesaka

(57) ABSTRACT

The present invention provides a sol of spinous inorganic oxide particles not containing coarse particles, in which particles having extremely homogeneous particles are dispersed in a solvent. An acidic silicic acid is added to a dispersion liquid of core particles to grow core particles, and then again the acidic silicic acid is added at the addition rate 1.2 to 1.8 higher than that in the previous step to prepare a sol of spinous inorganic oxide particles. Then the sol is subjected to centrifugation to remove coarse particles having the diameter of 800 nm or more, thus spinous inorganic oxide particles having peculiar form such as a spinous one being obtained.

6 Claims, No Drawings

SOL OF SPINOUS INORGANIC OXIDE PARTICLES, METHOD OF PRODUCING THE SOL, AND POLISHING AGENT CONTAINING THE SOL

TECHNICAL FIELD

The present invention relates to a sol of inorganic oxide particles in which inorganic oxide particles having a peculiar form, namely spinous oxide particles are dispersed in a solvent, especially to a sol of spinous inorganic oxide particles having homogeneous diameters from which coarse particles have been removed, and a method of producing the sol. The sol of spinous inorganic oxide particles according to the present invention can be used as an additive for paint, an additive for resin, a component of an ink accepting layer, a component of cosmetics, and is especially useful in the field of polishing agents and aggregation accelerators.

BACKGROUND TECHNOLOGY

In production of semiconductor integrated circuit boards, in the process of forming a circuit with a metal such as copper on a surface of a silicon wafer, unevenness or steps are generated on a surface of the silicon wafer, and therefore generally a metallic portion of the circuit is at first removed by polishing to eliminate steps on the surface. When an aluminum wiring is formed on a silicon wafer and a film of oxide such as silica is provided on the aluminum wiring as an insulating film, unevenness is generated due to the wiring, and therefore the oxide film is polished for flattening. In the process of polishing the circuit board, it is required that there is no step nor unevenness on the polished surface, the surface is flat and smooth without any flaw at the micro level, and also that the polishing rate is high.

Furthermore, in the field of semiconductor materials, a degree of integration has been becoming increasingly higher in association with the tendency for downsizing and higher sophistication in performance of electric and electronic products, and if there are impurities such as Na or K, for instance, in a transistor separation layer, sometimes the expected performance is not provided, or a failure may occur. Especially, when Na is deposited on a surface of a polished semiconductor substrate or an oxide film, because dispersibility of Na is high, Na is captured in blemishes or the like of the oxide film, which in turn may cause insulating fault or short circuitry when a circuit is formed on the semiconductor substrate, or may cause lowering of the dielectric constant. Because of the features as described above, or when the semiconductor substrate is used for a long time, a failure may occur. Therefore, particles for polishing including little impurities such as Na or K are strongly required.

A silica sol, fumed silica, fumed alumina or the like have been used as particles for polishing.

Polishing agents used in the CMP (Chemical Mechanical Polishing) process generally comprises spherical particles for polishing formed with a metal oxide such as silica or alumina with the average particle diameter of around 200 nm, an oxidant for the purpose to improve the polishing rate for metals for metals for wiring or circuits, and an additive such as an organic acid, and a solvent such as pure water. Because steps (convex and concave sections) caused by a groove pattern for wiring formed on the base insulating film are present on a surface of a polished material (substrate), and therefore it is required to polish the substrate down to the common plane mainly removing the convex sections for obtaining a flat surface. With the conventional spherical particles for polishing, however, when a portion above the common plane is polished, sometimes metal for circuitry within a wiring groove under a concave section may disadvantageously be polished even to a level lower than the common plane (this problem is referred to as "dishing"). When the dishing occurs, a thickness of wiring may become smaller to cause various problems such as increase of wiring resistance or lowering of flatness of an insulating film formed on the portion. Therefore it is required to suppress occurrence of dishing.

It is known that, when a polishing agent including particles having peculiar forms is used for polishing a substrate having the unevenness (convex and concave sections) as described above, polishing of the concave sections is suppressed until upper end faces of the convex sections are polished to the same level of bottom faces of the concave sections, and that, after the upper faces of the convex sections are polished down to the bottom faces of the concave sections, both the convex and concave sections are polished at the same polishing rate, and therefore dishing does not occur, and the polished surface of the substrate does not have the unevenness and is excellent in the flatness. With the polishing agent, dishing does not occur in a polishing process for forming, for instance, a semiconductor integrated circuit, and therefore increase of circuit resistance in the obtained integrated circuit does not occur, and a surface of the polishing substrate is excellent in the flatness, so that a laminated integrated circuit can efficiently be formed.

Expected fields for application of the polishing agent including particles having peculiar forms aluminum include mirror finish of wiring on an aluminum disk (aluminum or a metal skin of aluminum substrate) or on a semiconductor multi-layered wiring substrate, a glass substrate of an optical disk or a magnetic disk, a glass substrate of a liquid crystal display, a glass substrate of a photo mask, and other vitreous materials.

JP H01-317115A (Patent document 1) discloses a method of producing a silica sol including heteromorphic particles of silica with the ratio $D_1/D_2$ of more than 5 wherein $D_1$ indicates a particle diameter measured by the image analysis method and is in the range from 40 to 500 millimicrons, and $D_2$ indicates a particle diameter measured by the nitrogen gas adsorption method. The silica sol produced by the method of the present invention includes amorphous colloidal silica particles extending in one plain with homogeneous diameter in the range of 5 to 40 millimicrons observed by an electron microscope to make elongate shape dispersed in liquid medium. The method comprises the steps of: (a) adding a predefined volume of an aqueous solution containing water-soluble calcium salt, magnesium salt or the like in a pre-defined colloidal aqueous solution of activated silicic acid and agitating the mixture solution; (b) adding an alkali metal oxide, a water-soluble organic base, or a water-soluble silicate of the compounds is added so as to make the mole ratio of $SiO_2/M_2O$ to be in the range of 20 to 200 (M indicates a molecule of the alkali metal oxide or the organic base); and (c) heating the mixture in the step at 60-150 degrees C. for 0.5-40 hours.

JP H04-65314A (Patent document 2) describes a method of producing a stable silica sol with the $SiO_2$ concentration of 50% by weight or below and the ratio $D_1/D_2$ in the range from 3 to 5 wherein $D_1$ indicates a particle diameter measured by the image analysis method and is in the range from 40 to 500 millimicrons, and $D_2$ indicates a particle diameter measured by the nitrogen gas adsorption method. In the method, when addition of an aqueous solution of the active silicic acid to a sol of slender silica particles, collapse of colloidal silica particles in the feed sol does not occur, and the added active silicic acid is deposited via the siloxane bond on a surface of the original slender particle to provide colloidal silica having a slender form with the diameter increased from the original one.

JP H04-187512A (Patent document 3) discloses a method of producing a sol, in which chain-like silica particles are dispersed in a solvent, with the $SiO_2/M_2O$ molar ratio in the range from 60 to 100. This method comprises the steps of adding a silicic acid solution into an aqueous solution of an alkali metal silicate with the $SiO_2$ content in the range from 0.05 to 5.0% by weight to prepare a mixture solution with the $SiO_2/M_2O$ ratio in the range from 30 to 60; adding a compound of one or more types of metals selected from the group consisting of Ca, Mg, Al, In, Ti, Zr, Sn, Si, Sb, Fe, Cu, and rare earth metals (before, during, or after addition of the silicic acid solution) to the mixture solution; maintaining the mixture solution at a temperature of 60 degrees C. or more for a prespecified period of time; and further adding a silicic acid solution into the mixture solution.

JP 3441142C (Patent document 4) proposes a polishing agent for semiconductor wafers comprising a stable silica sol in which a percentage of a silica particles having a major axis in the range from 7 to 1000 nm and a minor axis/major axis ratio in the range from 0.3 to 0.8 is 50% or more among all of the particles contained in the sol.

JP H07-118008A (Patent document 5) discloses a method of producing a sol of slender silica particles, and the method comprises the steps of adding an aqueous solution of a water-soluble potassium salt, a water-soluble magnesium salt, or a mixture thereof into a colloidal solution of active silicic acid; adding an alkaline substance into the obtained aqueous solution; heating a portion of the obtained mixture material up to 60 degrees C. or more to prepare a heel liquid (with the remaining portion defined as a feed liquid herein); adding the heel liquid to the feed liquid to evaporate water during the adding operation for obtaining a condensed liquid with the $SiO_2$ concentration in the range from 6 to 30% by weight.

JP H08-279480A (Patent document 6) discloses that, in the aqueous solution of colloidal silica prepared by, for instance, (1) a method in which an aqueous solution of alkali silicate is neutralized with a mineral acid, an alkaline substance is added in the neutralized solution, and the mixture solution is heated for aging; (2) a method in which an alkaline substance is added in active silicic acid obtained by subjecting an aqueous solution of alkali silicate to positive ion exchange, and the mixture solution is heated for aging; (3) a method in which active silicic acid obtained by hydrolyzing alkoxy silane such as ethyl silicate is heated for aging; and (4) a method in which silica particles are directly dispersed in an aqueous medium, colloidal silica generally having the diameter in the range from 4 to 1,000 nanometers and preferably having the diameter in the range from 7 to 500 nanometers are dispersed in an aqueous medium, and that the colloidal silica aqueous solution has the concentration in the range from 0.5 to 50% by weight and preferably in the range from 0.5 to 30% by weight calculated as that of $SiO_2$. The document also describes that forms of the silica particles include a spherical form, irregular form, a flat form, a plate-like form, a slender form, a fibrous form, and the like.

JP H11-214338A (Patent document 7) discloses a method of polishing a silicon wafer with a polishing agent containing colloidal silica particles as the main component, and the colloidal silica particles are obtained by methyl silicate refined by distillation is reacted to water in a methanol solvent in the presence of ammonia or in the presence of ammonia and ammonium salt as catalysts, and the major axis/minor axis ratio of the colloidal silica particle is 1.4 or more.

WO 00-15552A (Patent document 8) discloses a silica sol comprising spherical colloidal silica particles with the average diameter in the range from 10 to 80 nanometers and silica containing a metal oxide and bonding the spherical colloidal silica particles to each other, in which the ratio $D_1/D_2$ of the particle diameter ($D_1$) measured by the image analysis method versus the average diameter of the spherical colloidal silica particles ($D_2$: measured by the nitrogen adsorption method) is 3 or more, $D_1$ is in the range from 50 to 500 nanometers, and the spherical colloidal silica particles are coupled to each other on one plain to form beads-like colloidal silica particles.

Patent document 8 also describes a method of producing the silica sol, and the method comprises the steps of (a) adding an aqueous solution of water-soluble metal salt to a predefined amount of a colloid aqueous solution of active silicic acid or an acidic silica sol so that a content of a metal oxide in the mixture solution against $SiO_2$ in the colloid aqueous solution or in the acidic silica sol is in the range from 1 to 10% by weight to prepare a mixture solution 1; (b) adding an acidic sol of spherical silica particles with the average diameter in the range from 10 to 80 nanometers and with the pH in the range from 2 to 6 to the mixture solution 1 so that the weight ratio A/B (A indicating a content of silica originated from the acidic sol of spherical silica particles and B indicating a content of silica originated from the mixture solution 1) is in the range from 5 to 100, and at the same time so that a total content (A+B) of silica in a mixture solution 2 obtained by mixing the acidic sol of spherical silica particles with the mixture solution 1 is in the range from 5 to 50% by weight of $SiO_2$ in the mixture solution 2; and (c) adding, a hydroxide of alkali metal, a water-soluble organic base or a water-soluble silicate salt the obtained mixture solution 2 so that the pH is in the range from 7 to 11, and heating the resultant mixture solution.

JP 2001-11433A (Patent document 9) describes a method of producing a sol of beads-like silica particles, and the method comprises the steps of an aqueous solution containing a water-soluble salt of bivalent or trivalent metal singly or in combination with salt(s) of other metal(s) in a colloid aqueous solution of active silicic acid containing $SiO_2$ by 0.5 to 10% by weight and also having pH of 2 to 6 so that a content of the metal oxide (calculated as that of MO in a case of a salt of a bivalent metal, and of $M_2O_3$ in a case of a trivalent metal, and M indicating a bivalent or trivalent metal atom, and O indicating an oxygen atom) against $SiO_2$ in the colloid aqueous solution of the active silicic acid and agitating the obtained mixture solution to obtain a mixture solution (1); adding an acidic sol of spherical silica particles with the average diameter in the range from 10 to 120 nm and also having the pH of 2 to 6 in the obtained mixture solution (1) so that a ratio A/B (weight ratio) of a content of silica originated from the acidic sol of spherical silica particles (A) and a content of silica originated from the mixture solution (1) (B) is in the range from 5 to 100, and at the same time so that a total content of silica (A+B) in a mixture solution (2) obtained by adding the acidic sol of spherical silica with the mixture solution (1) is in the range from 5 to 40% by weight calculated as that of $SiO_2$ in the mixture solution (2) and agitating the resultant mixture solution; adding a hydroxide of alkali metal or the like in the mixture solution (2) so that the pH is in the range from 7 to 11 to obtain a mixture solution (3); and heating the obtained mixture solution (3) at a temperature in the range from 100 to 200 degrees C. for 0.5 to 50 hours to obtain a sol of beads-like silica.

JP 2001-48520A (Patent document 10) discloses a method of producing a silica sol in which amorphous silica particles with the average diameter in the range from 5 to 100 nanometers when observed with an electron microscope in the diametrical direction and the length in the range from 1.5 to 50 times of the diameter and also having a slender form are dispersed in a liquid-like dispersing medium. The method comprises the steps of hydrolyzing alkyl silicate with an acid catalyst without using a solvent in a composition with the silica concentration of 1 to 8 mole/litter, the acid concentration of 0.0018 to 0.18 mole/litter, and the water concentration of 0.2 to 1.5 mole/litters; then diluting the hydrolyte with water so that the silica concentration is in the range from 0.2 to 1.5 mole/litter; adding an alkaline catalyst so that the pH is 7 or more; and heating the solution to proceed polymerization of the silicic acid.

JP 2001-150334A (Patent document 11) discloses a method of producing a sol of silica particles each having a distorted form, and the method comprises the steps of adding an alkali-earth metal such as salts of Ca, Mg, and Ba to an acidic aqueous solution of active silicic acid with the $SiO_2$ concentration of 2 to 6% by weight obtained by subjecting an aqueous solution of an alkali metal silicate such as water glass to the processing for removing positive ions at a weight ratio of 100 to 1500 ppm against $SiO_2$ contained in the active silicic acid calculated as that of the oxide; furthermore adding the alkaline substance to the solution obtained in the step above so that the $SiO_2/M_2O$ ratio (M denoting an alkali metal atom, $NH_4$ or a quaternary ammonium group) is in the range from 20 to 150 to obtain an original heel liquid; repeating the same step to obtain, as a charge liquid, an aqueous solution of active silicic acid having the $SiO_2/M_2O$ molar ratio (M denoting an alkali metal atom, $NH_4$ or a quaternary ammonium group) in the range from 20 to 150 calculated based on the $SiO_2$ concentration with the concentration of 2 to 6% by weight; and evaporating and removing water from the solution at a rate of 0.05 to 1.0 calculated as the weight ratio of $SiO_2$ in the charge liquid/$SiO_2$ in the original heel liquid per hour (this final step may optionally be eliminated).

JP 2003-133267A (Patent document 12) describes that the particles for polishing containing groups of particles having irregular forms in which two or more primary particles having the average diameter in the range from 5 to 300 nanometers are coupled to each other, especially particles for polishing in which a percentage of the primary particles constituting the groups of irregularly-formed particles against the total number of primary particles in the particles for polishing is in the range from 5 to 100% are effective as particles for polishing capable of being applied to polishing a surface of a substrate for flattening without causing dishing (excessive abrasion).

JP 2004-288732A (Patent document 13) discloses a slurry for polishing a semiconductor substrate containing non-spherical colloidal silica, an oxidizing agent, and an organic acid, and water in which a major axis/minor axis ratio of the non-spherical colloidal silica is in the range from 1.2 to 5.0, while also JP 2004-311652A (Patent document 14) discloses similar non-spherical colloidal silica.

JP H10-128121A (Patent document 15) describes a method of producing a silica sol or a composite silica sol in which an aqueous solution of an alkali silicate is added, in the presence of an electrolyte, to a dispersion liquid of core particles or an aqueous solution of an alkali silicate to grow core particles to produce a silica sol, or in which an aqueous solution of an alkali silicate and an aqueous solution of a metal salt other than silicate or an aqueous solution of a non-metal salt is added, in the presence of an electrolyte, to an aqueous solution of core particles or an aqueous solution of an alkali silicate to grow core particles to produce a sol of silica-based composite oxide particles. According to the document, in the production method, the production efficiency is excellent and a particle growth rate is high, and therefore the method makes it possible to obtain a stable sol of silica particles or silica-based composite oxide particles with homogeneous diameters.

The present applicant proposed, in JP 2003-26417A (Patent document 16), a method of producing a stable sol of silica particles having homogeneous particle diameters, in which the production efficiency is excellent and a rage of particle growth rate is high. In this method, a liquid II (an aqueous solution of an alkali silicate) is added, in the presence of an electrolyte comprising a strong acid, to a liquid I (a dispersion liquid of core particles or an aqueous solution of an alkali silicate) to grow core particles so that the equivalent ratio ($E_A/E_E$) ($E_A$ indicating a chemical equivalent of alkali in the liquid II and $E_E$ indicating a chemical equivalent of electrolyte) is set to the range from 0.5 to 8.

With the production method, it is possible to obtain a stable sol of silica particles having homogeneous particle diameters, but when the sol is used as a composition for polishing, the polishing performance is limited.

JP H03-257010A (Patent document 17) describes an example of silica-based particles each having projections on a surface thereof, and the silica particles have, on a surface thereof, successive irregular projections each having the size in the range from 0.2 to 5 μm when observed with an electron microscope, the average diameter in the range from 5 to 100 μm, the specific surface area of 20 $m^2/g$ or below when measured by the BET method, and the pore volume of 0.1 mL/g or below.

JP 2002-38049A (Patent document 18) describes silica-based particles each having a substantially spherical and/or semi-spherical projections on an entire surface of the core particle in which the projections are bonded to the core particles by chemical bond, and also describes silica-based particles each having a substantially spherical and/or semi-spherical projections on an entire surface of the core particle in which the projections are chemically bonded to the core particles. Furthermore, the document describes a method of producing silica-based particles, and the method comprises the steps of (A) generating polyorgano-siloxane by hydrolyzing a specific alkoxysilane compound and condensating the hydrolyte, (B) subjecting the polyorgano-siloxane particles to the surface processing with a surface absorbent; and (C) forming projections on the entire surface of the polyorgano-siloxane particle having been subjected to the surface processing in step (B) above with the alkoxysilane compound.

JP 2004-35293A (Patent document 19) discloses silica-based particles each having substantially spherical or semi-spherical particles on the entire surface of a maternal particle thereof. The silica-based particle is characterized in that the projections are chemically bonded to the maternal particles, and a compressive elasticity modulus of the material particle when compressed by 10% is different from that of the projection.

However, the articles described in JP H03-257010A (Patent document 17) are mainly those having the average diameter in the range from 5 to 10 μm, and the silica-based particles disclosed in JP 2002-38049A (Patent document 18) are only those with the average diameter substantially in the range from 0.5 to 30 μm, and what is described above is also applicable to JP 2004-35293A (Patent document 19).

The present applicant reports, in JP 2001-352966A (Patent document 20), in relation to the technique for promoting aggregation or deposition of materials present in a liquid by adding a silica sol to a prespecified liquid, a lee-depositing agent for fermented liquid foods, and reports in the document that the agent is a sol in which silica particles are dispersed in water and a zeta potential of the particles is a negative value and the absolute value is 35 mV or more when the pH of the sol is in the range from 4 to 6, and also that, when the sol was added to soy sauce, then after 3 hours, turbidity of the soy sauce lowered from 58 to 20.

[Patent document 1] JP H01-317115A
[Patent document 2] JP H04-65314A
[Patent document 3] JP H04-187512A
[Patent document 4] JP 3441142C
[Patent document 5] JP H07-118008A
[Patent document 6] JP H08-279480A
[Patent document 7] JP H1-214338A
[Patent document 8] WO 00-15552A
[Patent document 9] JP 2001-11433A
[Patent document 10] JP 2001-48520A
[Patent document 11] JP 2001-150334A
[Patent document 12] JP2003-133267A
[Patent document 13] JP 2004-288732A
[Patent document 14] JP 2004-311652A
[Patent document 15] JP H10-128121A
[Patent document 16] JP 2003-26417A
[Patent document 17] JP H03-257010A
[Patent document 18] JP 2002-38049A
[Patent document 19] JP 2004-35293A
[Patent document 20] JP 2001-352966A

DISCLOSURE OF THE INVENTION

An object of the present invention is to provide a sol of spinous inorganic oxide particles and a method of producing the sol. The particles are spherical inorganic oxide particles having a peculiar form, namely a spinous form, do not include coarse ones, and have the extremely homogeneous diameter.

Another object of the present invention is to provide a composition for polishing containing the sol of spinous inorganic oxide particles according to the present invention. In other words, another object of the present invention is to provide a composition for polishing containing the sol of spinous inorganic oxide particles according to the present invention and having the capability of suppressing generation of scratches (linear flaws) generated on a surface of a polished substrate remarkably better as compared to the prior art, yet preserving the polishing rate substantially equivalent to that of the prior art, and insuring a high surface precision of the polished substrate.

Still another object of the present invention is to especially provide a flocculating agent containing the sol of spinous silica particles among various types of sols of spinous inorganic oxide particles.

The present invention achieves the objectives described above with a sol of spinous inorganic oxide particles having the following characteristics:

(a) the sphericity is in the range from 0.8 to 1;

(b) the surface roughness (SA1)/(SA2) is in the range from 1.20 to 1.70, wherein (SA1) indicates a specific surface area measured by the Sears method or by the BET method and (SA2) indicates a specific surface area converted from an average particle diameter (D2) measured by the image analysis method;

(c) the spinous inorganic oxide particle have verrucous projections formed on spherical inorganic oxide particles with the average particle diameter (D2) in the range from 10 to 60 nm (measured by the image analysis method) are dispersed in a solvent, and the sol of the spinous inorganic oxide particles satisfy the following conditions (d) and (e);

(d) the number of coarse particles having the diameter of 800 nm or more is 1500 particles/mL (converted to 1% by weight of solid phase concentration) or below;

(e) the coefficient of variation (CV value) is 7.0% or below.

The spinous inorganic oxide particles preferably comprise silica, silica-alumina, silica-zirconia, silica-ceria, silica-titania, or composites thereof.

A method of producing a sol of spinous inorganic oxide particles according to the present invention comprises the steps of:

continuously or intermittently adding an acidic silicic acid solution to a dispersion liquid of core particles (referred to as "early addition") to grow core particles;

furthermore continuously or intermittently adding the acidic silicic acid solution to the dispersion liquid at an addition rate of 1.2 to 1.8 times higher than that in the early addition (this step referred to as "late addition") to grow the core particles and to prepare a sol of the spinous inorganic oxide particles; and then removing coarse particles with diameter of 800 nm or more by centrifuging the sol obtained in the step above.

Preferably the dispersion liquid of core particles is a mixture of an aqueous solution of an alkali silicate and/or an alkali aqueous solution and an acidic silicic acid solution, and can grow silica particles when the acidic silicic acid solution is added therein.

The dispersion liquid of core particles is preferably a dispersion liquid of silica particles, alumina particles, zirconia particles, ceria particles, or particles of compositions of the particles.

pH of the dispersion liquid of core particles is preferably adjusted to the range from 8 to 12.

It is preferable to add 50 to 10,000 weight portions (as calculated as that of silica) of an acidic silicic acid solution to 100 weight portions of solid phase in the dispersion liquid of core particles at the rate of 0.020 to 80 weight portions (calculated as that of silica)/minute, and then to add 50 to 10,000 weight portions (calculated as that of silica) of the acidic silicic acid solution to the mixture solution obtained in the first step at the addition rate of 0.024 to 144 weight portions (calculated as that of silica)/minute.

The composition for polishing according to the present invention contains the sol of spinous inorganic oxide particles described above.

In the sol of spinous inorganic oxide particles according to the present invention, the solvent is water, and a zeta potential of the spinous inorganic oxide particles has a negative value and the absolute value is 25 mV or more when the pH of the sol is in the range from 4 to 6.

The flocculating agent according to the present invention contains the sol of spinous inorganic oxide particles.

The lee-depositing agent for fermented liquid foods according to the present invention contains the sol of spinous inorganic oxide particles.

The sol of spinous inorganic oxide particles according to the present invention includes spherical particles having peculiar verrucous projections, and diameter of the particles is homogeneous because coarse particles are removed. The sol of spinous inorganic oxide particles can be utilized, for instance, as a polishing agent as a component of a composition for polishing. With the composition for polishing containing the sol of spinous inorganic oxide particles, it is possible to suppress generation of scratches on a polished substrate during the polishing process remarkably more as compared to the conventional technique, yet preserving the polishing rate as the same level as that in the conventional technique, and furthermore to improve the surface precision of the polished substrate as compared to the conventional technique.

The spinous inorganic oxide particles have the infilling property, oil-adsorption capability, electric characteristics, optical characteristics, and physical characteristics different from those of ordinary spherical silica particles. Of the sols of spinous inorganic oxide particles according to the present invention, the sol of specific silica particles is excellent in the effect for aggregation of specific materials contained in a liquid.

With the production method according to the present invention, it is possible to easily prepare a sol of spinous inorganic oxide particles in which spinous spherical inorganic oxide particles having the homogeneous diameter are dispersed therein in a solvent, and from which coarse particles have been removed.

BEST MODE FOR CARRYING OUT THE INVENTION

[Sol of Spinous Inorganic Oxide Particles]

In the sol of spinous inorganic oxide particles according to the present invention, the spinous inorganic oxide particles dispersed in the sol have peculiar verrucous projections formed on the surfaces, and the form resembles a spinous sweet (called "Konpeitou" in Japanese), and the form is expressed as "spinous" in the present invention. The sol of spinous inorganic oxide particles according to the present invention includes the spinous inorganic oxide particles as described above (with the average particle diameter in the range from 10 to 60 nm), and does not include coarse particles, and furthermore the particle diameter is substantially homogeneous. The sol of spinous inorganic oxide particles according to the present invention has the characteristics as described above, and shows the excellent effect, for instance, when used a polishing agent.

The surface of spinous inorganic oxide particle with the verrucous projections formed thereon is defined according to the surface roughness.

In the present invention, the surface roughness is expressed by the (SA1)/(SA2), wherein (SA1) indicates a value of a specific surface area (a surface area per unit weight) measured by the Sears method or the BET method), and (SA2) indicates a value of a specific surface area converted from an average particle diameter (D2) measured by the image analysis method.

In the Sears method, the specific surface area (SA1) of a silica particle is measured from a consumption rate of an aqueous solution of sodium hydroxide when the aqueous solution of sodium hydroxide is dripped in a silica sol, and it may be said that the specific surface area measured by the Sears method reflects the actual surface area. More specifically, the more undulated and verrucous projects are on a surface of a particle, the larger a value of the specific surface area (SA1) is. It is to be noted that a specific surface area measured by the BET method may be used in place of the value measured by the Sears method.

As for the specific surface area (SA2) converted from the average particle diameter (D2) measured by the image analysis method, the value (SA2) is calculated based on the assumption that the silica particles dispersed in a sample silica sol are ideally spherical particles and through the following equation (1):

$$SA2 = 6000/(D2 \times \rho) \quad (1)$$

wherein D2 indicates an average particle diameter (D2) based on an average value of maximum diameters (DL) of 50 particles selected at random from a picture obtained by photographing the sol of spinous inorganic oxide particles as a sample with an transmission electron microscope.

In the equation (1), $\rho$ indicates a density of the sample particles, and the value is 2.2 in a case of silica. In the case of composite particles such as silica-alumina composite particles, silica-zirconia composite particles, silica-ceria composite particles or silica-titania composite particles, the value is calculated from densities of the respective oxides (3.3 to 4.0 for alumina, 5.49 for zirconia, 7.3 for ceria, and 4.6 for titania) and a weight ratio of the oxides in each sample particle.

The relational expression is based on the assumption, and therefore it may be said that a value of the specific surface area (SA2) corresponds to a specific surface area when the particles are spherical.

Because the specific surface area indicates a surface area for unit weight, and the more verrucous projections are on a surface of a particle, a value of the surface roughness (SA1)/(SA2) becomes larger on the condition that the particle is spherical, while the fewer verrucous projections are on a surface of a particle, and the smoother the surface is, the value of the surface roughness (SA1)/(SA2) becomes smaller and becomes closer to 1.

A surface roughness of the spinous inorganic oxide particles according to the present invention is in the range from 1.20 to 1.70. When the surface roughness is less than 1.20, a percentage of the verrucous projection is smaller, or the verrucous projections themselves have smaller diameters as compared to that of silica particles. The closer the surface roughness is to 1.00, the closer the particles are to spherical particles. When the surface roughness is in the range from 1.20 to 1.70, the sufficient effect can be achieved. The surface roughness is preferably in the range from 1.25 to 1.68.

The spinous inorganic oxide particles is required to be spherical, and peculiarly-formed particles having, for instance, a slender form, a bead-like form, and an egg-like form are excluded from the present invention. The term of "spherical" as used herein is defined as the sphericity in the range from 0.8 to 1.0. The sphericity as used herein means an average value of a ratio (DS/DL) of a maximum diameter (DL) and a minor diameter (DS) perpendicular to the maximum diameter for 50 particles selected at random from a picture obtained by photographing with an transmission electronic microscope. When the sphericity is less than 0.8, the inorganic oxide particle can not be regarded as a spherical one, and sometimes is categorized as the peculiarly-formed particles.

An average particle diameter (D2) of the spinous inorganic oxide particles according to the present invention is in the range from 10 to 60 nm when measured by the image analysis method. When the average diameter is less than 10 nm, it is not easy to prepare silica particles having the required surface roughness. When the average particle diameter is in the range described above, the effect of the present invention can be achieved. The average particle diameter (D2) of the spinous inorganic oxide particles according to the present invention is preferably in the range from 12 to 40 nm.

Any of water, an organic solvent, or a mixture solvent thereof may be used as a solvent in which the spinous inorganic oxide particles according to the present invention are dispersed.

The spinous inorganic oxide particles according to the present invention is required to satisfy the requirements for the sphericity, the surface roughness, and the average particle diameter of the particles themselves, and also required to satisfy the condition that number of coarse particles with the diameters of 800 nm or more (converted to 1 weight % as a concentration of the inorganic oxide) is 1500 particles/mL or less, and that a coefficient of variation (CV value) in a distribution of the particle diameter is 7.0% or below.

When the sol of spinous inorganic oxide particles according to the present invention is used as a polishing agent, the coarse particles are apt to generate scratches on a surface of a polished substrate, therefore smaller amount of coarse particles is preferable. More specifically, the number of coarse particles with the diameters of 800 nm or more (converted to 1 weight % as a concentration of the inorganic oxide) should be 1500 particles/mL or less. When the content of the coarse particles is more than 1500 particles/mL, generation of scratches on a surface of a polished substrate becomes remarkable. The number of coarse particles in the sol is preferably 1430 particles/mL or less.

As for distribution of particle diameter of the spinous inorganic oxide particles in the sol of spinous inorganic oxide particles according to the present invention, a coefficient of variance (CV value) is required to be 7.0% or below. The coefficient of variance (CV value) [%] is calculated from the following relation expression:

Coefficient of variance (CV value)=[Standard deviation of particle diameters ($\sigma$)/average particle diameter ($D_n$)]×100. The more homogeneous the distribution of particle diameters of the spinous inorganic oxide particles, the smaller the coefficient of variance (CV value) is. Because distribution of particle diameters in the sol of spinous inorganic oxide particles according to the present invention is homogeneous, for instance, a substrate polished with a composition containing the sol of spinous inorganic oxide particles according to the present invention as described above has the excellent surface precision, and generation of scratches on a surface of the substrate can substantially be suppressed. The coefficient of variance (CV value) of the particles is preferably 6.0% or less.

The sol of spinous inorganic oxide particles according to the present invention satisfying the requirements for the surface roughness, the sphericity, the average particle diameter, the numbers of coarse particles, and the coefficient of variance include spinous particles having verrucous projections, and does not include coarse particles substantially, and furthermore distribution of the particle diameters is extremely homogeneous. The sol of spinous inorganic oxide particles according to the present invention is very specific in the point that the spinous particles with the extremely homogeneous particle diameter are distributed in the solvent. Because of the feature, when the sol of spinous inorganic oxide particles according to the present invention is used as a polishing agent, the verrucous projections of the particle surface acts to a surface of a polished substrate evenly, so that the substrate's surface can be polished with an extremely excellent surface precision, and also generation of scratches can be suppressed.

In a method of producing the sol of spinous inorganic oxide particles according to the present invention as described below, the inorganic oxide for forming the spinous inorganic oxide particles can be selected from the group consisting of silica, silica-alumina, silica-zirconia, silica-ceria, silica-titania, or composites thereof. More specifically, the sol of spinous inorganic oxide particles according to the present invention may contain any of spinous silica particles, spinous silica-alumina composite particles, spinous silica-zirconia composite particles, spinous silica-ceria composite particles, spinous silica-titania composite particles, or other spinous composite particles containing two or more selected from alumina, zirconia, ceria or titania and silica. From the view point of cost or the like, the spinous silica particles or spinous silica-alumina composite particles are especially preferable for preparing the sol of spinous inorganic oxide particles according to the present invention.

The sol of spinous inorganic oxide particles according to the present invention has excellent effects for promoting aggregation as well as deposition of materials dispersed in specific dispersants, and especially has an excellent effect for protein contaminants present in fermented liquid foods.

Generally the zeta potential of silica particles dispersed in a sol changes according to a pH value of the sol. Because the pH value, for instance, in fermented liquid foods is generally in the range from 4 to 6, the sol according to the present invention can be used for determining a zeta potential of silica particles with the pH in the range from 4 to 6.

For the sol of spinous inorganic oxide particles according to the present invention to show the excellent effects for aggregation and deposition (lee deposition effect), it is required that the zeta potential is a negative value and the absolute value is 25 mV or more when the sol has the pH value of 4 to 6.

In the sol of spinous inorganic oxide particles according to the present invention, the zeta potential of the silica particles has a negative value and the absolute value is 25 mV or more when the sol has the pH value of 4 to 6, and the absolute value is extremely large. On the other hand, proteins constituting lee show a negative zeta potential as a whole, but the absolute value is smaller as compared to that of the lee-depositing agent according to the present invention, and the value is around −5 mV. The larger the difference is between the zeta potential of the proteins and that of the spinous inorganic oxide particles according to the present invention, the more easily the proteins in fermented liquid foods cause the heterogeneous aggregation.

Furthermore, because the spinous inorganic oxide particles according to the present invention have the spinous form including many projections, the specific surface area is extremely larger and the particle diameters are extremely homogeneous. Because the spinous inorganic oxide particles have a larger surface area, the reaction sites with dispersed materials such as proteins increase, which provides the excellent aggregation effect. Furthermore, because homogeneity of diameters of the spinous inorganic oxide particles is high, flocks are effectively formed, which also promotes aggregation. It is conceivable that, when the homogeneity is low and there are many small particles, the flocks causing deposition are hardly formed.

In addition to the causes as described above, because the spinous inorganic oxide particles according to the present invention have spinous surfaces, also the contact effect with dispersed materials such as proteins increases, which is conceivably another reason for the effects for promoting aggregation and deposition (lee deposition effect) of the particles according to the present invention more excellent as compared to the conventional lee-depositing agents based on a silica sol.

The silica sol according to the present invention, which can be used as a lee-depositing agent, preferably has the $SiO_2$ concentration in the range from 10 to 40% by weight.

The sol of spinous inorganic oxide particles according to the present invention is well adapted to the use for depositing lees causing contamination by proteins in liquid foods such as alcoholic products including refined sake, Japanese sweet rice wine for cooking, and wine, soy sauce, vinegar, and fruit juices. For removing lees causing contamination by proteins in fermented liquid foods, the sol of spinous inorganic oxide particles according to the present invention are added to the fermented liquid foods as described above, and the mixture is well agitated. Then the contaminating proteins in the liquid foods are immediately deposited. The aggregated and deposited materials are separated by using any known technique such as filtering.

An amount of the sol of spinous inorganic oxide particles into liquid foods changes according to a quantity of contaminating proteins, and there is not any specific restriction over the amount of added sol, and the sol may be used in the concentration range from 10 to 10000 ppm.

When the method of depositing lees as described above is employed, it is also possible to add, in addition to the lee-depositing agent, a flocculating agent capable of promoting growth of aggregated materials, namely proteins such as gelatin or soluble giant molecules such as polyvinyl pyrrolidone for further promoting aggregation.

The spinous inorganic oxide particles according to the present invention showing especially excellent effects for promoting aggregation and deposition (lee deposition effect) satisfies the following conditions:

(a) the sphericity is in the range from 0.8 to 1;

(b) the surface roughness (SA1)/(SA2) is in the range from 1.20 to 1.70, wherein (SA1) indicates a specific surface area measured by the Sears method or by the BET method and (SA2) indicates a specific surface area converted from an average particle diameter (D2) measured by the image analysis method;

(c) the spinous inorganic oxide particle have verrucous projections formed on spherical inorganic oxide particles with the average particle diameter (D2) in the range from 10 to 60 nm (measured by the image analysis method).

The spinous inorganic oxide particles each having verrucous projections on a surface of a spherical inorganic oxide particles are dispersed in a solvent, to form a sol, and the sol is required to further satisfy the following conditions (d), (e), and (f):

(d) the number of coarse particles having the diameter of 800 nm or more is 1500 particles/mL (converted to 1% by weight of solid phase concentration) or below;

(e) the coefficient of variation (CV value) is 7.0% or below; and (f) the zeta potential of the spinous inorganic oxide particles is a negative value and the absolute value is 25 mV or more when the sol has the pH value of 4 to 6.

From the view point of cost for raw materials or the like, the sol of spinous silica particles or the sol of spinous silica-alumina composite particles is especially preferable. Furthermore, when the sol of spinous inorganic oxide particles according to the present invention is added to a fermented liquid food to promote aggregation or deposition (lee deposition effect), the sol of spinous inorganic oxide particles according to the present invention may be used singly or in combination of a lee-depositing agent comprising other types of silica sol.

[Method of Producing a Sol of Spinous Inorganic Oxide Particles]

In the method of producing the sol of spinous inorganic oxide particles according to the present invention, during the step of gradually adding a silicic acid solution to a dispersion liquid of core particles, by increasing an addition rate of the silicic acid solution to grow particles, and furthermore coarse particles are removed by centrifugal separation to homogenize the particle diameters. The production method is described below.

Dispersion Liquid of Core Particles

The dispersion liquid of core particles used in the method of producing the sol of spinous inorganic oxide particles according to the present invention is an indispensable raw material in the method of producing a sol of spinous inorganic oxide particles, and in the dispersion liquid, particles functioning as cores for growth of particles when an acidic silicic acid solution is added are dispersed in a solvent.

There is no specific restriction over the core particles so long as the particles can be used as cores for growth of particles. Any of silica particles, alumina particles, zirconia particles, ceria particles, or composite particles thereof can advantageously be used as the core particles. It is preferable to add an alkali silicate, before addition of an acidic silicic acid solution to the dispersion liquid of the core particles to adjust the pH to the range from 8 to 12, more preferably to the range from 9.5 to 11.5. When the alkali silicate is added, because the concentration of $SiO_2$ dissolved in the dispersing medium is previously set to a high value prior to addition of the acidic silicic acid solution for growth of particles, silicic acid is easy to precipitate on the core particles quickly.

It is preferable to use, as the alkali silicate, alkali silicates other than sodium silicate (sodium water glass) such as potassium silicate (potassium water glass) or a solution prepared by dissolving silica in an organic base such as quaternary amine. If necessary, it is allowable to add an alkali metal hydroxide other than NaOH, ammonium or quaternary ammonium hydride. Further such alkali earth metal hydroxides such as $Mg(OH)_2$, $Ca(OH)_2$, $Sr(OH)_2$, $Ba(OH)_2$, or the like can advantageously be used for the purpose.

Furthermore, as the core particle dispersion liquid, a mixture of an aqueous solution of alkali silicate and/or an alkali aqueous solution and an acidic silicic acid solution may be used so long as the mixture is effective for preparing silica particles when an acidic silicic acid solution is added thereto. In this case, if silica particles are dispersed in a dispersion medium, the material can be used as a dispersion liquid of core particles, but if the silica concentration becomes higher during addition of the acidic silicic acid solution for growth of particles and silica particles grow, the alkali silicate may be used. In the case of the mixture of an aqueous solution of alkali silicate and/or an alkali aqueous solution and an acidic silicic acid solution, it is preferable that a mole ratio of $SiO_2/M_2O$ (M indicating an alkali metal) is in the range from 10 to 70 and the silica concentration is in the range from 0.5 to 7% by weight.

A type of the alkali silicate used in this step may be the same as that of the alkali silicate described above. An ammonia water is used as the alkali solution. The pH is preferably in the range from 8 to 12 like in the step described above.

Particle diameters of the core particles are selected according to diameters of particles in a sol to be obtained finally, but because an upper limit of average diameters of spinous inorganic oxide particles in a sole to be obtained is 60 nm, the diameters of the core particles are 60 nm or below, and preferably 50 nm or below. There is no specific lower limit for diameters of the particles so long as the particles are used as core particles, but the lower limit is preferably larger than an oligomer of a silicic acid, especially larger than that formed with 10 molecules of the silicic acid.

A form of the core particle is preferably spherical, because the final product to be obtained is spinous inorganic oxide particles each having verrucous projections of a surface of a spherical inorganic oxide particle. Remarkably chain-like particles or bead-like particles comprising several particles may not become spherical ones even when subjected to the process of particle growth, and the particles having the forms as described above are not preferable.

A concentration of the dispersion liquid of core particles varies according to a particle diameter of the core particles, but generally the concentration as that of the oxide is preferably in the range from 0.005 to 10% by weight, and more preferably in the range from 0.01 to 5% by weight. When the concentration of the core particle dispersion liquid is less than 0.005% by weight, the amount of core particles is too small, and in this case, the productivity remarkably drops. When the concentration of the core particle dispersion liquid is over 10% by weight, the concentration is too high, and the core particles may aggregate when an alkali is added.

Aging

The core particle dispersion liquid is aged, if required, after adjusting pH. A temperature for aging is preferably in the range from 40 to 150 degrees C., and more preferably in the range from 60 to 100 degrees C. The time for aging varies according to the temperature employed for aging, but is generally in the range from 30 minutes to 5 hours. When the dispersion liquid is aged as described above, the dispersion liquid of core particles is stabilized in the characteristics.

Acidic Silicic Acid Solution and Growth of Particles

The acidic silicic acid solution used in the method of producing a sol of spinous inorganic oxide particles according to the present invention is prepared by dealkylating a water-soluble silicate, and is generally an aqueous solution of a low polymer of a silicic acid obtained by an aqueous solution of a silicate, for instance, with a cation-exchange resin. This type of silicic acid solution has preferably pH in the range from 2 to 4, the $SiO_2/Na_2O$ (mole ratio) in the range from 100 to 5,000, and the $SiO_2$ concentration of 10% by weight, preferably in the range from 2 to 7% by weight, because the silicic acid solution satisfying the conditions described above is hardly gelatinized at the normal temperature and is relatively stable. Therefore the silicic acid solution satisfying the conditions above is used as a raw material in the actual production process.

In the method of producing the sol of spinous inorganic oxide particles according to the present invention, an acidic silicic acid solution is continuously or intermittently added to the dispersion liquid of core particles described above (this step is referred to "early addition"), and then an acidic silicic acid solution is added continuously or intermittently at an addition rate of 1.2 to 1.8 times higher than that in the early addition (this step is referred to as "late addition"). It can be considered that, when an addition rate of an acidic silicic acid solution to a dispersion liquid of core particles is raised at the step of particle growth, the added acidic silicic acid solution is not precipitated on a particle surface in the monomer-like state, but are deposited in the oligomer-like state or as it is on the particle surface, and that therefore verrucous projections are easily formed on the particle surface.

In the production method according to the present invention, the acidic silicic acid solution is continuously or intermittently added to a dispersion liquid of core particles, and the addition rate as used herein means an average addition rate in the early period and in the late period respectively. Specific modes for addition of the acidic silicic acid solution include, for instance, (1) a case in which the acidic silicic acid solution is dripped, and (2) a case where the acidic silicic acid solution is continuously fed.

In the early addition period, it is required that spherical inorganic oxide particles generate through the normal growth of particle. To satisfy this requirement, the ordinary conditions for particle growth are employed in the early addition period.

More specifically, an acidic silicic acid solution corresponding to 50 to 5000 weight portions of silica contained in the solution is added to 100 weight portions of silica contained in the dispersion liquid of core particles at a temperature of 20 degrees C. or below and at the addition rate of 0.020 to 80 weight portions per minute. When an amount of added silicic acid solution is over 5000 weight portions, sometimes an average diameter of spinous inorganic oxide particles in the obtained sol may be over 60 nm, and in this case, two-stage addition of an acidic silicic acid solution can not be performed. When the amount is less than 50 weight portions, sometimes it is impossible to obtain particles having the size sufficiently large enough for growing cores for verrucous projections in the late addition step.

The temperature during addition of the acidic silicic acid solution is preferably 20 degrees C. or below, and more preferably in the range from 1 to 18 degrees C. for maintaining long-term stability of the acidic silicic acid solution.

When the addition rate is less than 0.02 weight portions per minute, the productivity remarkably drops, and the verrucous projections are hardly generated. When the addition rate is over 80 weight portions per minute, the particles easily aggregate, or new core particles are newly generated.

There is no specific restriction over the time required for the early addition step so long as the addition rate for the early addition and the amount of added acidic silicic acid solution satisfy the conditions as described above.

After completion of the early addition, a period for the late addition performed at a higher addition rate of the acidic silicic acid solution than that in the early addition is immediately followed.

More specifically, an amount of an acidic silicic acid solution corresponding to 50 to 5,000 weight portions contained in the solution is added to 100 weight portions of silica contained in the core particle dispersion liquid at the temperature of 20 degrees C. or below and at the addition rate in the range from 0.024 to 144 weight portions per minute. The addition rate of an acidic silicic acid solution during the late addition is required to be 1.2 to 1.8 times higher than that in the early addition. When the addition rate is made higher in the range described above, the sol of spinous inorganic oxide particles having verrucous projections on the surface can easily be prepared because of the reasons as described above.

When the ratio of the addition rate in the late addition against that in the early addition is less than 1.2 times, dissolution of the acidic silicic acid solution sufficiently proceeds, and monomers are easily generated, so that verrucous projections are hardly generated. When the ratio is over 1.8 times, the inorganic oxide particles easily aggregate when an acidic silicic acid solution is added rapidly, which does not contributes to growth of particles and core particles are apt to be generated.

An amount of a silicic acid solution (calculated as that of silica contained in the solution) is preferably in the range from 50 to 5000 weight portions against 100 weight portions of silica contained in the dispersion liquid of core particles (the silica originated from the acidic silicic acid solution added during the early addition step is not included). The temperature for the late addition is preferably at 20 degrees C. or below, and more preferably in the range from 1 to 18 degrees C. for maintaining stability of the acidic silicic acid solution when used for a long term.

Especially, when the addition rate is more than 144 weight portions per minute, aggregation of inorganic oxide particles and generation of new core particles become easier to occur. Also the time required for last addition depends on an amount of a sol of spinous inorganic oxide particles to be obtained finally, and there is no specific restriction over the time.

As for the time required for last addition, there is not specific restriction so long as the addition rate or the addition amount of an acidic silicic acid solution is respectively in the range described above.

Aging

A total amount of acidic silicic acid solution is added, and then the mixture is aged, if required. The temperature for aging is in the range from 40 to 150 degrees C., more preferably in the range from 60 to 100 degrees C., and the time for aging varies according to the temperature for aging, and is generally in the range from 30 minutes to 5 hours. By aging the mixture under the conditions described above, it is possible to obtain a sol of silica particles having more homogeneous diameters and more excellent stability.

Condensation

The obtained sol of spinous inorganic oxide particles is condensed according to the necessity. The condensation is generally performed by ultrafiltration, distillation, or a combination thereof. A concentration of the sol of spinous inorganic oxide particles obtained as described above is generally in the range from 10 to 50% by weight.

Centrifugation

The sol of spinous inorganic oxide particles obtained by growing particles is subjected to centrifugation to remove coarse particles and also to homogenize the particle diameters. The conditions for centrifugation are a) that the number of coarse particles with the diameter of 800 nm or more is 1500 particles/mL (converted to the inorganic oxide concentration of 1% by weight) or below, and b) that a coefficient of variation of particles in the particle distribution is 7% or below, and there is not specific restriction so long as the two conditions above are satisfied. Generally, a solid phase concentration of the sol of spinous inorganic oxide particles is preferably in the range from 1 to 50% by weight and the centrifugal force is in the range from 500 to 20000 G.

[Polishing Agent and Composition for Polishing]

The sol of spinous inorganic oxide particles according to the present invention is useful as a polishing agent and a composition for polishing. More specifically, the sol of spinous inorganic oxide particles according to the present invention can be used directly as a polishing agent, but can be used as an ingredient for an ordinary composition for polishing together with other components (such as a polishing promoter agent or the like).

The composition for polishing according to the present invention is prepared by dispersing the spinous inorganic oxide particles for polishing described above in a dispersion medium. Although water is used as the dispersion medium, also such alcohols as methyl alcohol, ethyl alcohol, and isopropyl alcohol may be used according to the necessity, and in addition such water-soluble organic solvents as ethers, esters, and ketones may be used.

A concentration of spinous inorganic oxide particles for polishing in the polishing material should preferably be in the range from 2 to 50 weight %, and more preferably in the range from 5 to 30 weight %. When the concentration is less than 2 weight %, the concentration is too low for some types of substrates and insulating films, and in that case the polishing rate is too low to provide high productivity. When the concentration of silica particles is over 50 weight %, stability of the polishing material is insufficient, so that the polishing rate or the polishing efficiency can not further be improved, and sometimes dried materials may be generated and deposited on the substrate during the process of feeding a dispersion liquid for the polishing process, which may in turn generate scratches.

Any of such known additives as hydrogen peroxide, peracetic acid, urea peroxide, and a mixture thereof may be added to the polishing material according to the present invention, although the appropriate additive varies according to a type of a work to be polished. When such additive as hydrogen peroxide is used, the polishing rate can effectively be improved in the case of metallic work to be polished.

Further, such acids as sulfuric acid, nitric acid, phosphoric acid, and fluoric acid; sodium salts, potassium salts, and ammonium salts of these acids; and a mixture thereof may be added to the polishing material according to the present invention. When a plural types of works are polished with these additives, by making higher or lower the polishing rate for a particular work comprising specific components, finally a planarized surface can be obtained by polishing.

As other additives, imidazole, benzotriazole, benzothiazole, or the like may be used to prevent corrosion of a substrate by forming an immobilized layer or a dissolution suppressing layer on a surface of the metallic work to be polished.

Further such organic acids as citric acid, lactic acid, acetic acid, oxalic acid, and phtalic acid, or a complex forming agent for these organic acids may be added to the polishing material to disturb the immobilized layer.

Cationic, anionic, nonionic, or amphoteric surfactant may be added to the polishing material for improving dispersibility or stability of a slurry of the polishing material.

Further, pH of the slurry of polishing material may be adjusted by adding an acid or a base according to the necessity to improve the effect of adding each of the additives as described above.

With the present invention, since the spinous inorganic oxide particles for polishing contain a prespecified content of carbon and also have elasticity, the polishing rate with the polishing material comprising the particles for polishing can easily be controlled without any scratch generated, and a surface of a substrate can be polished into the extremely planarized and smooth state. Further the spinous inorganic oxide particles substantially contain no Na content, so that Na is not deposited on a surface of a semiconductor substrate or an oxidized film, and therefore the spinous inorganic oxide particles for polishing according to the present invention are extremely useful in planarizing a substrate, especially in forming a metal wiring layer in a semiconductor integrated circuit.

[Measuring Method Used in the Following Examples]

Preferred embodiments of the present invention are described below. In the following descriptions, [1] a method of calculating a specific surface area (SA2) calculated from an average particle diameter (D2) measured by the image analysis method; [2] a method of measuring a specified surface area (SA1) measured by the Sears method; [3] a method of measuring a specified surface area (SA1) measured by the BET method; [4] a method of measuring the sphericity; [5] a method of measuring the number of coarse particles; and [6] a method of measuring the particle size distribution are as described in [1] to [6] below respectively unless otherwise specified, and results of measurement or calculation are as shown in Table 2.

As for [7] a method of accessing the polishing performance to an aluminum substrate, the samples are quantified or accessed by the analysis method [7] described below, and the results are shown in Table 2. Furthermore, [8] a method of measuring the zeta potential and [9] a method of measuring the turbidity are as described in [8] and [9] below, and the result are shown in Table 3.

[1] Method of Calculating a Specific Surface Area (SA2) Calculated from an Average Particle Diameter (D2) Measured by the Image Analysis Method A sample silica sol is photographed with a transmission electron microscope (produced by Hitachi, Ltd.: H-800) at the magnification of 250,000 times, and maximum diameters (DL) of 50 particles selected at random on the picture are measured, and the average value is determined as the average particle diameter (D2). The average particle diameter (D2) is substituted into the equation (1) to obtain the specific surface area (SA2).

[2] Method of Measuring a Specified Surface Area (SA1) and an Average Particle Diameter (D1) Measured by the Sears Method 1) A sample corresponding to 1.5 grams of $SiO_2$ is put in a beaker, and then the sample is put in a reaction bath (kept at the temperature of 25 degrees C.), and then pure ware is added to increase the liquid quantity to 90 ml. The subsequent operations are performed in the reaction bath kept at 25 degrees C.

2) Hydrochloric acid with the concentration of 0.1 mole/L is added to adjust the pH to 3.6 to 3.7.

3) 30 grams of sodium chloride is added, and the mixture solution is diluted with pure water to 150 ml, and the diluted liquid is agitated for 10 minutes.

4) A pH electrode is set, and the pH is adjusted to 4.0 with agitation dripping an aqueous solution of sodium hydroxide with the concentration of 0.1 mole/L.

5) The sample with the pH adjusted to 4.0 is titrated with an aqueous solution of sodium hydroxide with the concentration of 0.1 mole/L, and the titers for the pH of 8.7 to 9.3 and pH values are recorded at four time points or more, and an analytical curve is prepared by plotting the titers of the aqueous solution of sodium hydroxide with the concentration of 0.1 mole/L as parameter X and the corresponding pH values as parameter Y.

6) A consumption rate V (ml) of the aqueous solution of sodium hydroxide with the concentration of 0.1 mole/L required until the pH per 1.5 grams of $SiO_2$ is adjusted to the range from 4.0 to 9.0 is calculated through the following equation (2), and SA1 is calculated through the equation (3). The average particle diameter D1 (nm) is calculated through the equation (4).

$$V = (A \times f \times 100 \times 1.5)/(W \times C) \quad (2)$$

$$SA1 = 29.0V - 28 \quad (3)$$

$$D1 = 6000/(\Sigma \times SA1) \quad (4)$$

(ρ: Density of sample, 2.2 in a case of silica)

Meaning of each sign in the equation (2) above is as follows:

A: Titer (ml) of the sodium hydroxide solution with the concentration of 0.1 mole/L required until the pH per 1.5 grams of $SiO_2$ is adjusted to the range from 4.0 to 9.0 f: Potency of the sodium hydroxide solution with the concentration of 0.1 mole/L required C: $SiO_2$ concentration of sample (%)

W: Amount of sample (g)

[3] Measurement of a Specific Surface Area by the BET Method pH of 50 ml of a silica sol is adjusted to 3.5 with $HNO_3$, then 40 ml of 1-propanol is added to the silica sol, and the mixture is dried for 16 hours at the temperature of 110 degrees C. Then the sample is pulverized in a mortar, and the pulverized material is sintered for 1 hour at 500 degrees C. to obtain a sample for measurement. Then a specific surface area is calculated from an amount of adsorbed nitrogen by the BET 1-point method and with a specific surface area measurement instrument (produced by Yuasa Ionics, Model No. Multi-soab 12).

More specifically, 0.5 grams of sample is put in a measurement cell, and the sample is subjected to degassing for 20 minutes in a flow of mixed gas containing nitrogen by 30% by volume and helium by 70% by volume at 300 degrees C. Then the gas is kept at the temperature of liquid nitrogen in the mixed gas described above to have nitrogen equilibrium-adsorbed in the sample. Then flowing the mixed gas, the temperature of the sample is gradually raised to the room temperature, a quantity of nitrogen released during the time is detected, and a specified surface area of the silica sol is calculated by referring to an analytical curve previously prepared. The average particle diameter D1 (nm) is obtained from the equation (4).

[4] Method of Measuring Sphericity

A ratio of a maximum diameter (DL) and a minor diameter (DS) perpendicular to the maximum diameter (DS/DL) are measured for each of 50 particles selected at random from 50 particles from a photogram taken from the sample silica sol at the magnification of 250,000 times with a transmission electron microscope (produced by Hitachi, Inc.; H-800), and the average value is used as a value indicating the sphericity.

[Measurement of the Number of Coarse Particles]

The number of coarse particles is measure with a gain size analyzer (produced by Particle Sizing Systems Corp, Model: Acu-Sizer 780 APS) based on a particle counter system.

This measurement instrument counts the number of pulses generated from particles passing through a measurement sensor based on the light-shuttering system as well as on the light scattering system, and the measurement is performed under the conditions of loop: 0.5 ml, syringe: 2.5 ml, DF2: 200 (secondary dilution within the device, dilution ratio: 1:200, and time for measurement: 120 sec or below.

A sample for measurement is 0.5 ml of silica sol diluted with pure water to the silica concentration of 15% percent, and the measurement value is converted to the number of coarse particles with the diameter of 800 nm or more contained in 1 ml of the silica sol with the silica concentration of 1.0% by weight, and a result of measurement is shown in Table 1.

[6] Measurement of Grain Size Distribution

Particles are photographed with scan electron microscope (produced by JEOL Ltd.: JSM-5300) at the magnification of 250,000 times to take a picture. The average particle diameter of 250 particles on the picture are measured with an image analyzer (produced by Asahi Kasei Corporation, IP-1000), and a coefficient of variation (CV value) is calculated from the grain size distribution.

More specifically, particle diameters of the 250 particles are measured, and an average particle diameter and a standard deviation of the particle diameters are calculated from the values, and the coefficient of variation (CV value) is calculated through the equation (5):

$$\text{Coefficient of variation(CV value)} = [\text{standard deviation of particle diameters } (\sigma)/\text{average particle diameter}(D_n)] \times 100 \quad (5)$$

Method of accessing polishing performance to an aluminum substrate

Preparation of Slurry for Polishing $H_2O_2$, HEDP (1-hydroxy ethylidene-1,1-disulfonic acid), and ultra-pure water are added to the sol of spinous silica particles with the silica concentration of 20% by weight obtained in each embodiment and each comparative example to prepare a slurry for polishing with the silica contents of 9% by weight, the $H_2O_2$ concentration of 0.5% by weight, and the HEDP concentration of 0.5% by weight, and furthermore $HNO_3$ is added to the mixture according to the necessity to prepare a slurry for polishing with the pH of 2.

Substrate for Polishing

A substrate for an aluminum disk is used as a substrate for polishing. This substrate for an aluminum disk is a substrate (95 mmφ/25 mmφ–1.27 mmt) prepared by electroless-plating an aluminum substrate with Ni—P (hard Ni—P plated layer with the Ni content of 88% and P content of 12%) to the thickness of 10 μm. This substrate is subjected to primary polishing and has the surface roughness (Ra) of 0.17 nm.

Polishing Test

The substrate for polishing is set in a polishing device (produced by Nano Factor Corp, NF300), and a polishing pad ("Apolon" produced by Rhordel Corp.) is used. The substrate is polished for 5 minutes at the range of 20 grams/minute feeding a slurry for polishing at the table rotation speed of 30 rpm with the substrate load of 0.05 MPa. The polishing rate is calculated by measuring a change in the weight of the substrate before and after the polishing. More specifically, a difference (gram) between a weight before polishing and that after polishing is divided by the specific gravity (8.4 grams/cm$^3$), and the quotient is divided by a surface area (65.97 cm$^2$) of the substrate and the time required for polishing to obtain a polishing rate (nm/min) per unit time.

Generation of Scratches

A substrate for an aluminum disk is polished as described above, and generation of scratched is checked by observing the entire polished surface a ultra fine defect visualizing device (Micro-MAX, produced by VISON PSYTEC Co.) at Zoom 15, and the number of scratches (linear flaws) is counted on a surface of the polished surface corresponding to 65.97 cm$^2$.

Profile Irregularity

The profile irregularity as used herein means roughness of a polished surface. For measuring profile irregularity, an atom force microscope (produced by Digital Instruments: AFM, NanoScope IIIa). A surface roughness of the polished substrate is measured at the scan rate of 1.0 Hz with the scan area of 2.0×2.0 μm, and the obtained value is determined as a surface roughness Ra (nm).

[8] Method of Measuring a Zeta Potential

A zeta potential is measured with a zeta potential measuring device based on the ultrasonic system (produced by Matec Corp, ESA8000). pH of a sample silica sol is adjusted to a prespecified value (pH 4 and pH 6) with an aqueous solution of hydrochloric acid previously diluted and also a concentration of silica particles in the sol is adjusted to 5% by weight. In this state, the zeta potential is measured at the temperature of 25 degrees C.

[9] Method of Measuring Turbidity

A sample liquid is poured by 10 ml into a cell for measurement, and the turbidity is measured with a turbidity meter (produced by CORONA Electric Co. Ltd., product No.: UT-21, measurement system: forward light scattering system and scattered light/transmitted light ratio system, measurement range: 0 to 500 kaolin, measurement time: 2 sec, measured sample: batch system (10-mm cell).

Synthesis example 1

Preparation of a Silicic Acid Solution 7,000 grams of sodium silicate with the concentration of 7% (water glass No. 3) is passed through an ultrafiltration module (produced by Asahi Kasei CO., SIP-1013) and the filtered water is recovered to obtain refined water glass. Pure water is added to the refined water glass to adjust the silica concentration to 5%. Then 6,500 grams of water glass with the silica concentration of 5% is passed through a strongly acidic cation exchange resin SK1BH (produced by Mitsubishi Chemicals Co. Ltd.) 2.2 L at the space velocity of 3.1 to obtain 6,650 grams of silicic acid solution. The obtained silicic acid solution has the silica concentration of 4.7%.

Example 1

839.5 grams of pure water was added to 67.2 grams of sodium silicate (water glass No. 3 with the SiO$_2$ concentration of 24.28% by weight) to prepare 906.7 grams of an aqueous solution of sodium silicate with the silica concentration of 1.8% by weight. 264.1 grams of the silicic acid solution obtained in Synthesis Example 1 was added and the mixture was agitated. Then the agitated mixture was warmed up to 79 degrees C. and maintained at the temperature for 30 minutes to obtain a dispersion liquid of core particles. Assuming that 28.7 grams of silica contained in the core particle dispersion liquid was 100 weight portions, weight portions of added silicic acid solutions are shown.

Then, 6122.2 grams of the silicic acid solution obtained in Synthesis Example 1 above having been cooled down to 18 degrees C. was continuously at the addition rate of 11.3 grams/minute (1.8 weight portions/min of silica) for 9 hours. Then 2040.6 grams of the silicic acid solution obtained in Synthesis Example 1 above having been cooled down to 18 degrees C. was continuously added at the addition rate of 17.0 gram/minute (2.8 weight portions/minute of silica) for 2 hours. After the addition was completed, the mixture was maintained at 79 degrees C. for 1 hour, and then was cooled to the room temperature.

The obtained silica sol was condensed with an ultrafiltration membrane (SIP-1013, produced by Asahi Kasei Co. Ltd.) to the silica concentration of 12% by weight. Then the solution was condensed with a rotary evaporator to the concentration of 20%.

It was confirmed that the obtained silica sol was a sol of spinous silica particles in which the spinous silica particles were dispersed in water, and that the silica particles had the following characteristics, namely the average particle diameter (D2) measured by the image analysis method of 15 nm, the specific surface area of 181.8 m$^2$/g (converted from D2), the specific surface of 248 m$^2$/g (measured by the Sears method), the sphericity of 0.88, the surface roughness of 1.36, the coefficient of variation (CV value) of 3.8%, the number of coarse particles with the diameter of 800 nm of 4800 particles/ml (converted to the silica concentration of 1% by weight of the spinous silica particle sol).

[Centrifugation]

5 litters of the sol of spinous silica particles with the silica concentration of 20% by weight obtained as described above was continuously poured into a rotor (type: QNS, capacity: 1 litter) of a centrifugal separator (produced by KOKUSAN, H-660) and was passed through the separator at the rate of 400 g/min with 7000 G and the filtered liquid was continuously recovered to separate the coarse particles by centrifugation. The coarse particles were deposited inside the rotor.

It was confirmed that the obtained silica sol had the average particle diameter (D2) of 15 nm when measured by the image analysis method, the specific surface area of 181.8 m$^2$/g when converted from D2, the specific surface area of 248 m$^2$/g when measured by the Sears method, the sphericity of 0.86, the surface roughness of 1.36, the coefficient of variation (CV value) of 3.6%, the number of coarse particles with the diameter of 800 nm or more of 400 particles/ml (converted to the silica concentration of 1% by weight of the sol of spinous silica particles).

[Polishing Test]

The assessment test was performed by accessing the polishing performance of the sol of spinous silica particles having been subjected to centrifugation to the aluminum substrate as described in [7] above. The same assessment test was performed also in Examples 2, 3 and Comparative Examples 1 to 7. The results of polishing test are shown in Table 2.

Example 2

Preparation of a Sol of Spinous Silica Particles 673.1 grams of pure water was added to 41.2 grams of sodium silicate (water glass No. 3 with the $SiO_2$ concentration of 24.28% by weight) to prepare 714.3 grams of an aqueous solution of sodium silicate with the silica concentration of 1.4% by weight. 37.2 grams of silicic acid solution obtained in Synthesis Example 1 was added to the aqueous solution of sodium silicate, the mixture was agitated. Then the agitated solution was warmed up to 83 degrees C. and maintained at the temperature for 30 minutes to obtain a dispersion liquid of core particles. In the following description, weight portions of added silicic acid solution are shown on the assumption that 11.7 grams of silica contained in the core particle dispersion liquid was 100 weight portions.

Then 4470.5 grams (1788 weight portions as converted to silica content) obtained in Synthesis Example 1 cooled down to 18 degrees C. was continuously added over 8.1 hours at the addition rate of 9.2 g/min (3.7 weight portions/min as converted to silica content). Then, 1915.9 grams of the silicic acid solution obtained in Synthesis Example 1 cooled down to 18 degrees C. (766 weight portions as converted to silica content) was continuously added over 2.9 hours at the addition rate of 11.0 grams/min (4.4 weight ports/min as converted to silica). After completion of the addition, the mixture was maintained at 83 degrees for 1 hour and then was cooled down to the room temperature.

The obtained silica sol was condensed to the silica concentration of 12% by weight with ultrafiltration membrane (SIP-1013, produced by Asahi Kasei CO., Ltd.). Then the solution was further condensed to the concentration of 20% by weight with a rotary evaporator.

The obtained silica sol was a sol of spinous silica particles in which spinous silica particles were dispersed in water, and it was confirmed that the spinous silica particles had the average particle diameter (D2) of 23 nm when measured by the image analysis method, the specific surface area of 118.6 $m^2/g$ when converted from D2, the specific surface area of 152 $m^2/g$ when measured by the Sears method, the sphericity of 0.95, the surface roughness of 1.28, the coefficient of variation (CV value) of 3.3%, the number of coarse particles with the diameter of 800 nm or more of 2800 particles/ml (as converted to the silica concentration of 1% by weight in the sol of spinous silica particles).

[Centrifugation]

5 litters of the sol of spinous silica particles with the silica concentration of 20% by weight obtained as described above was continuously poured into a rotor (QNS, capacity: 1 litter) of a centrifugal separator (produced by KOKUSAN, H-660) and was passed through the separator at the rate of 400 g/min with 7000 G and the filtered liquid was continuously recovered to separate the coarse particles by centrifugation. The coarse particles were deposited inside the rotor.

It was confirmed that the obtained silica sol had the average particle diameter (D2) of 23 nm when measured by the image analysis method, the specific surface area of 118.6 $m^2/g$ when converted from D2, the specific surface area of 152 $m^2/g$ when measured by the Sears method, the sphericity of 0.96, the surface roughness of 1.28, the coefficient of variation (CV value) of 3.2%, the number of coarse particles with the diameter of 800 nm or more of 1100 particles/ml (converted to the silica concentration of 1% by weight of the sol of spinous silica particles).

Example 3

Preparation of a Sol of Spinous Silica Particles 705.9 grams of pure water was added to 46.5 grams of sodium silicate (water glass No. 3 with the $SiO_2$ concentration of 24.28% by weight) to prepare 752.4 grams of an aqueous solution of sodium silicate with the silica concentration of 1.5% by weight. 12.9 grams of silicic acid solution obtained in Synthesis Example 1 was added to the aqueous solution of sodium silicate, and the mixture was agitated. Then the agitated solution was warmed up to 83 degrees C. and maintained at the temperature for 30 minutes to obtain a dispersion liquid of core particles.

Then 917.3 grams (363 weight portions as converted to silica content) obtained in Synthesis Example 1 cooled down to 18 degrees C. was continuously added over 3 hours at the addition rate of 5.1 g/min (2.0 weight portions/min as converted to silica content). Then, 5497.2 grams of the silicic acid solution obtained in Synthesis Example 1 cooled down to 18 degrees C. (2173 weight portions as converted to silica content) was continuously added over 12 hours at the addition rate of 7.6 grams/min (3.0 weight ports/min as converted to silica). After completion of the addition, the mixture was maintained at 83 degrees for 1 hour and then was cooled down to the room temperature.

The obtained silica sol was condensed to the silica concentration of 12% by weight with ultrafiltration membrane (SIP-1013, produced by Asahi Kasei CO., Ltd.). Then the solution was further condensed to the concentration of 20% by weight with a rotary evaporator.

The obtained silica sol was a sol of spinous silica particles in which spinous silica particles were dispersed in water, and it was confirmed that the spinous silica particles had the average particle diameter (D2) of 36 nm when measured by the image analysis method, the specific surface area of 75.8 $m^2/g$ when converted from D2, the specific surface area of 96 $m^2/g$ when measured by the Sears method, the sphericity of 0.9, the surface roughness of 1.27, the coefficient of variation (CV value) of 5.3%, the number of coarse particles with the diameter of 800 nm or more of 3500 particles/ml (as converted to the silica concentration of 1% by weight in the sol of spinous silica particles).

[Centrifugation]

2 litters of the sol of spinous silica particles with the silica concentration of 20% by weight obtained as described above was continuously poured into a rotor (QNS, capacity: 1 litter) of a centrifugal separator (produced by KOKUSAN, H-660) and was passed through the separator at the rate of 400 g/min with 7000 G and the filtered liquid was continuously recovered to separate the coarse particles by centrifugation. The coarse particles were deposited inside the rotor.

It was confirmed that the obtained silica sol had the average particle diameter (D2) of 37 nm when measured by the image analysis method, the specific surface area of 73.7 $m^2/g$ when converted from D2, the specific surface area of 94 $m^2/g$ when measured by the Sears method, the sphericity of 0.90, the surface roughness of 1.28, the coefficient of variation (CV value) of 5.1%, the number of coarse particles with the diameter of 800 nm or more of 1400 particles/ml (converted to the silica concentration of 1% by weight of the sol of spinous silica particles).

Comparative Example 1

An assessment test was performed to the sol of spinous silica particles prepared in Example 1 but not having been subjected to centrifugation by using the sol for polishing an aluminum substrate as described in [7] above.

Comparative Example 2

The sol of silica particles with the silica concentration of 40.6% by weight and the average diameter of 83 nm converted from the specific surface area measured by the BET method was diluted with pure water to the silica concentration of 20% by weight. It was confirmed that the particles in the sol had the average particle diameter (D2) of 115 nm when measured by the image analysis method, the specific surface area of 23.7 $m^2/g$ converted from D2, the specific surface area of 33 $m^2/g$ when measured by the BET method, the sphericity of 0.98, the surface roughness of 1.39, the coefficient of variation (CV value) of 11.2%, and the number of coarse particles having the diameter of 800 nm or more of 2600 particles/ml (as converted to the silica concentration of 1% by weight in the sol of spinous silica particles.

Comparative Example 3

The sol of spinous silica particles prepared in Example 3 but not having been subjected to centrifugation was tested in the performance of polishing an aluminum substrate like in Comparative Example 1.

Comparative Example 4

An aqueous solution of sodium silicate with the $SiO_2$ concentration of 24% by weight (having the $SiO_2/Na_2O$ mole ratio of 3.1) was diluted with ion-exchange water to prepare 1 Kg of an aqueous solution of sodium silicate with the $SiO_2$ concentration of 5% by weight (pH: 11.3).

Sulfuric acid was added to the aqueous solution of sodium silicate to adjust the pH to 6.5, and the mixture solution was kept at the normal temperature for 1 hour to prepare a silica hydro gel. This silica hydro gel was sufficiently washed with pure ware (by an amount corresponding to about 120 times of solid phase $SiO_2$) by using an Oliver filter to remove salt contents. A concentration of sodium sulfate after the washing process was less than 0.01% against the solid phase $SiO_2$.

The obtained silica hydro gel was dispersed in pure water (to the silica concentration of 3% by weight), and the dispersed gel was agitated with a strong agitation machine to a slurry with fluidity to obtain a dispersion liquid of silica hydro gel. Then a NaOH aqueous solution with the concentration of 5% by weight was added to adjust the $SiO_2/Na_2O$ mole ratio to 75, and the mixture solution was heated to 160 degrees C. over one hour.

Then, 0.81 Kg of an aqueous solution of sodium silicate with the concentration of 24% and 10.93 Kg of pure water were added to 2.09 Kg of the silica sol to prepare 13.83 Kg of a seed sol (pH: 11.2). An average particle diameter in this seed sol was 17 nm when measured with the dynamic light scattering method.

This seed sol was maintained at 83 degrees C., and 175.8 kg of a silicic acid solution with the $SiO_2$ concentration of 3% by weight was added to the seed sol over 14 hours.

After completion of addition, the seed sol was cooled down to the room temperature, and the obtained sol of silica particles having peculiar forms was condensed to the $SiO_2$ concentration of 20% by weight. This silica sol was subjected to centrifugation like in Example 1.

The obtained silica sol contains silica particles having peculiar forms, and it was confirmed that the particles had the specific surface area of 78 $m^2/g$ when measured by the BET method, the coefficient variation (CV value) of 15.3%, and the number of coarse particles with the diameter of 800 nm or more of 6600 particles/ml (converted to the silica concentration of 1% by weight in the silica sol).

Synthesis Example 2

Preparation of a Silicic Acid Solution 0.8 Kg of sodium silicate (water glass No. 3) with the silica concentration of 24% was passed through a ultrafiltration module (SIP-1013, produced by Asahi Kasei), and the filtered water was recovered to obtain refined water glass. Pure water was added to the obtained refined water glass to adjust the silica concentration of 3.2%. 6.500 grams of this diluted water glass was passed through a strongly acidic cation-exchange resin SK1BH (produced by Mitsubishi Chemicals) 2.2 L at the space velocity of 3 L/hour to obtain 6,650 grams of an acidic silicic acid solution. The silica concentration of the obtained silicic acid solution was 3.0%.

Comparative Example 5

Pure water was added to the silicic acid solution with the silica concentration of 4.7% prepared like in Synthesis Example 2 to adjust the silica concentration of 2%. Then the mixture solution was agitated, and ammonia water with the concentration of 1% was added to adjust the pH to 4.8, and the mixture solution was maintained at the room temperature for 2 hours for aging to obtain 6650 grams of a polymerized silicic acid solution.

Ammonia water with the concentration of 15% was added to 1,000 grams of the polymerized silicic acid solution to adjust the pH to 10.4. Then the mixture solution was heated to 95 degrees C. and maintained at the temperature for one hour. Then the solution was cooled down to the room temperature to obtain a transparent and bluish sol. The particles in the obtained sol had the average particle diameter of 31 nm when measured by the dynamic light scattering method and also with the solid phase concentration of 1.9%.

20.81 grams of water glass No. 3 with the silica concentration of 24.25% was added to 284.7 grams of the heated sol to adjust the pH to 11.2. Then the mixture was heated to 83 degrees C. and was maintained at the temperature for 30 minutes. Then 4,333 grams of the silicic acid solution obtained in Synthesis Example 2 (with the silica concentration of 3.0% by weight) was added to the mixture over 18 hours. After completion of addition, the mixture was further maintained at 83 degrees C. for one hour, and then was cooled down to the room temperature.

Then the mixture solution was condensed with an ultrafiltration membrane and a rotary evaporator like in Example 1 to obtain a silica sol with the concentration of 30%.

[Centrifugation]

The silica sol with the silica concentration of 30% by weight was diluted with pure water to the silica concentration of 20% by weight, and then centrifugation was performed like in Example 1.

It was confirmed that the particles in the obtained sol had the specific surface area of 119 $m^2/g$ when measured by the BET method, the sphericity of 0.51, the coefficient of variation (CV value) of 21.6%, and the number of coarse particles with the diameter of 800 nm or more (converted to the silica concentration of 1% by weight in the silica sol) of 2400 particles/ml, and that the particles had peculiar forms.

Comparative Example 6

626.5 grams of the silica sol with the silica concentration of 30% by weight obtained in Comparative Example 5 was diluted with 3239 grams of ultra-pure water, and 20.8 grams of water glass No. 3 with the silica concentration of 24.25% by weight was added to the diluted sol to adjust the pH to 10.7. Then the mixture sol was heated to 87 degrees C. and was maintained at the temperature for 30 minutes. Then 4,333 grams of the silicic acid solution prepared in Synthesis Example 2 (with the silica concentration of 3.0% by weight) to the mixture over 2 hours. After completion of addition, the mixture was maintained at 87 degrees for one hour and was then cooled down to the room temperature.

Then the mixture solution was condensed with an ultrafiltration membrane and a rotary evaporator like in Example 1 to obtain a silica sol with the silica concentration of 30% by weight.

[Centrifugation]

The silica sol with the silica concentration of 30% by weight was diluted with pure water to the silica concentration of 20% by weight, and was then subjected to centrifugation like in Example 1.

The obtained silica sol contained spinous silica particles, and it was confirmed that the particles in the sol had the specific surface area of 85 m$^2$/g when measured by the BET method, the sphericity of 0.58, the coefficient of variation (CV value) of 18.4%, and the number of coarse particles with the diameter of 800 nm or more of 2500 particles/ml (converted to the silica concentration of 1% by weight in the sol of spinous silica particles).

Comparative Example 7

Different from Example 3, the two-stage addition comprising the early addition and the late addition was not employed. In Comparative Example 7, a silica sol (with the silica concentration of 20% by weight) was prepared by like in Example 3 excluding the point that 6414.5 grams of an acidic silicic acid solution was maintained at the temperature of 35 degrees C. and was added at the addition rate of 7.2 g/min (2.8 weight portions/min as converted to silica) without changing the addition rate over 15 hours. Then the silica sol was subjected to centrifugation like in Example 3 to prepare a silica sol (with the silica concentration of 20% by weight).

The obtained sol contained silica particles having peculiar formed dispersed in water, and it was confirmed that the particles in the sol had the average particle diameter (D2) of 27 nm when measured by the image analysis method, the specific surface area of 101 m$^2$/g converted from D2, the specific surface area of 135 m$^2$/g when measured by the Sears method, and the number of coarse particles with the diameter of 800 nm or more of 4200 particles/ml (converted to silica concentration of 1% by weight in the silica sol).

TABLE 1

|  |  |  |  | Example ||| Comparative Example |||
|---|---|---|---|---|---|---|---|---|---|
| Item || Property | Unit | 1 | 2 | 3 | 1 | 3 | 7 |
| Preparation | water glass | SiO2 conc. | wt % | 1.8 | 1.4 | 1.5 | 1.8 | 1.5 | 1.5 |
|  |  | usage | g | 906.7 | 714.3 | 752.4 | 906.7 | 752.4 | 752.4 |
|  |  | SiO2 amount | g | 16.3 | 10.0 | 11.3 | 16.3 | 11.3 | 11.3 |
|  | silicic acid solution | SiO2 conc. | wt % | 4.7 | 4.7 | 4.7 | 4.7 | 4.7 | 4.7 |
|  |  | usage | g | 264.1 | 37.2 | 12.9 | 264.1 | 12.9 | 12.9 |
|  |  | SiO2 amount | g | 12.4 | 1.7 | 0.6 | 12.4 | 0.6 | 0.6 |
| Dispersion Liquid of Core Particles || pH |  | 10.9 | 10.8 | 10.8 | 10.9 | 10.6 | 10.8 |
|  |  | SiO2 contents | g | 28.7 | 11.7 | 11.9 | 28.7 | 11.9 | 11.9 |
| Aging of the Dispersion Liquid of Core Particles || temp. | °C. | 79 | 83 | 83 | 79 | 83 | 83 |
|  |  | holding time | Hours | 0.5 | 0.5 | 0.5 | 0.5 | 0.5 | 0.5 |
| Early Addition | SiO2 in disp. liquid | mass | g | 28.7 | 11.7 | 11.9 | 28.7 | 11.9 | 11.9 |
|  | added silicic acid solution | added mass | g | 6122.2 | 4470.5 | 917.3 | 6122.2 | 917.3 | 6414.5 |
|  |  | SiO2 conc. | mass % | 4.7 | 4.7 | 4.7 | 4.7 | 4.7 | 4.7 |
|  |  | SiO2 amount | g | 288 | 210 | 43 | 288 | 43 | 301 |
|  | SiO2 in despersion liquid || wt port. | 100 | 100 | 100 | 100 | 100 | 100 |
|  | SiO2 in added silicic acid solution || wt port. | 1,001 | 1,788 | 363 | 1,001 | 363 | 2,535 |
|  | adding condition of silicic acid solution | temp. | °C. | 15 | 15 | 15 | 15 | 15 | 35 |
|  |  | time | Hours | 9.0 | 8.1 | 3.0 | 9.0 | 3.0 | 15 |
|  |  | adding rate | g/min | 11.3 | 9.2 | 5.1 | 11.3 | 5.1 | 7.2 |
|  |  | adding rate of SiO2 | g/min | 0.5 | 0.4 | 0.2 | 0.5 | 0.2 | 0.3 |
|  |  |  | wt port/min | 1.8 | 3.7 | 2.0 | 1.8 | 2.0 | 2.8 |
| Late Addition | SiO2 in disp. Liquid | mass | g | 28.7 | 11.7 | 11.9 | 28.7 | 11.9 | — |
|  | added silicic acid solution | added mass | g | 2,040.6 | 1,915.9 | 5,497.2 | 2,040.6 | 5,497.2 | — |
|  |  | SiO2 conc. | mass % | 4.7 | 4.7 | 4.7 | 4.7 | 4.7 | — |
|  |  | SiO2 mass | g | 96 | 90 | 258 | 96 | 258 | — |
|  | SiO2 in despersion liquid || wt port. | 100 | 100 | 100 | 100 | 100 | — |
|  | SiO2 in added silicic acid solution || wt port. | 334 | 766 | 2,173 | 334 | 2,173 | — |
|  | adding condition of silicic acid solution | temp. | °C. | 15 | 15 | 15 | 15 | 15 | — |
|  |  | time | Hours | 2.0 | 2.9 | 12.0 | 2.0 | 12.0 | — |
|  |  | adding rate | g/min | 17.0 | 11.0 | 7.6 | 17.0 | 7.6 | — |
|  |  | adding rate of SiO2 | g/min | 0.8 | 0.5 | 0.4 | 0.8 | 0.4 | — |
|  |  |  | wt port/min | 2.8 | 4.4 | 3.0 | 2.8 | 3.0 | — |
|  | ratio of adding rate | (late/early) |  | 1.5 | 1.2 | 1.5 | 1.5 | 1.5 | — |
|  | Aging | temp. | °C. | 79 | 83 | 83 | 79 | 83 | 83 |
|  |  | holding time | Hours | 1 | 1 | 1 | 1 | 1 | 1 |

TABLE 2

|  | Property | Remarks | Unit | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| Before Centrifugation | (SA1) | Sears method | m²/g | 248 | 152 | 96 | 248 | 33 | 96 | — | — | — | — |
|  | (D1) | from (SA1) | nm | 11 | 18 | 28 | 11 | 83 | 28 | — | — | — | — |
|  | (D2) | image analysis | nm | 15 | 23 | 36 | 15 | 115 | 36 | — | — | — | — |
|  | (SA2) | from (D2) | m²/g | 181.8 | 119 | 75.8 | 181.8 | 23.7 | 75.8 | — | — | — | — |
|  | surface roughness | (SA1/SA2) |  | 1.36 | 1.28 | 1.27 | 1.36 | 1.39 | 1.27 | — | — | — | — |
|  | sphericity | (minor/max) |  | 0.88 | 0.95 | 0.9 | 0.88 | 0.98 | 0.9 | — | — | — | — |
|  | coarse particles | image analysis | piece | 4800 | 2800 | 3500 | 4800 | 2600 | 3500 | — | — | — | — |
|  | particle size distrib. | (CV value) | % | 3.8 | 3.3 | 5.3 | 3.8 | 11.2 | 5.3 | — | — | — | — |
| preparation condition | concentration of sol |  | wt % | 20 | 20 | 20 | — | — | — | 20 | 20 | 20 | 20 |
|  | centrifugal force |  | G | 7000 | 7000 | 7000 | — | — | — | 7000 | 7000 | 7000 | 7000 |
|  | solution flow |  | g/min | 400 | 400 | 400 | — | — | — | 400 | 400 | 400 | 400 |
| After Centrifugation | (SA1) | Sears method | m²/g | 248 | 152 | 94 | — | — | — | 78 | 119 | 85 | 135 |
|  | (D1) | from (SA1) | nm | 11.0 | 18.0 | 29.0 | — | — | — | 35 | 23 | 32 | 20 |
|  | (D2) | image analysis | nm | 15 | 23 | 37 | — | — | — | — | — | — | 27 |
|  | (SA2) | from (D2) | m²/g | 181.8 | 118.6 | 73.7 | — | — | — | — | — | — | 101 |
|  | surface roughness | (SA1/SA2) |  | 1.36 | 1.28 | 1.28 | — | — | — | — | — | — | 1.34 |
|  | sphericity | (minor/max) |  | 0.86 | 0.96 | 0.9 | — | — | — | 0.66 | 0.51 | 0.58 | 0.9 |
|  | coarse particles | image analysis | piece | 400 | 1100 | 1400 | — | — | — | 6600 | 2400 | 2500 | 4200 |
|  | particle size distrib. | (CV value) | % | 3.6 | 3.2 | 5.1 | — | — | — | 15.3 | 21.6 | 18.4 | 7 |
| Effect | scratch |  | number | 53 | 23 | 70 | 120 | 607 | 133 | 379 | 308 | 343 | 602 |
|  | surface roughness |  | nm | 0.08 | 0.09 | 0.09 | 0.1 | 0.16 | 0.1 | 0.150 | 0.130 | 0.132 | — |
|  | polishing rate |  | nm/min | 47 | 35 | 28 | 47 | 20 | 28 | 45 | 42 | 50 | 34 |

Note:
The specific surface area in comparative example 2, 4, 5 and 6 are measured by the BET method in place of the Sears method.

Example 4

The sol of spinous silica particles prepared like in Example 3 was condensed with a rotary evaporator to prepare 50 grams of sol of spinous silica particles with the silica concentration of 30% by weight. 50 grams of the sol of spinous silica particles and 50 grams of a sol of silica particle with an average diameter of 10 nm and the silica concentration of 30% by weight (produced by Catalysts and Chemicals Industries Co. Ltd.: Cataloid SI-30) were mixed with each other. A zeta potential of silica particles in 100 grams of the obtained silica sol was −32 mV.

Lee deposition testing for soy sauce was performed by using the silica sol described above. The fired (thick) soy sauce was used in this testing, and especially soy sauce heated in the last step of the production process for being cleared was poured by 500 ml into a 1-litter beaker with an agitator. 0.6 ml of the silica sol was added to the sauce with agitation, and the mixture was agitated for 5 minutes. Then, 3 ml of a gelatin aqueous solution with the concentration of 1% by weight was added, and the mixture was further agitated for 10 minutes. Then the agitation was stopped, and changes in the turbidity were measured at several time points with a prespecified time interval. For measuring the turbidity, 10 ml of soy sauce was sampled, and the sauce was diluted 20 times with the 10% NaCl aqueous solution to obtain a sample for the testing, and 10 ml of the sample for testing was measured with a turbidity meter. The result is shown in Table 3.

Comparative Example 8

The lee deposition testing was performed for the silica sol used in Example 7 of the specification for JP 2001-352966 A (Patent document 20) like in Example 4. The result is shown in Table 3.

Comparative Example 9

The lee deposition testing was performed for the silica sol used in Comparative Example 4 described of the specification for JP 2001-352966 A (Patent document 20) like in Example 4. The result is shown in Table 3.

TABLE 3

|  | Zeta Pontential of Particle (pH5) | Turbidity after leaving 1 hour later | Turbidity after leaving 2 hours later | Turbidity after leaving 3 hours later |
|---|---|---|---|---|
| Example 4 | −32 mV | 15 | 8 | 3 |
| Comp. Example 8 | −45 mV | 56 | 38 | 20 |
| Comp. Example 9 | −15 mV | 90 | 75 | 65 |

INDUSTRIAL APPLICABILITY

The sol of spinous silica particles according to the present invention has high practical utility as a polishing agent. Furthermore, the sol of spinous silica particles has high practical utility as an aggregation promoting agent or a lee-depositing agent. Furthermore, the sol of spinous silica particles according to the present invention is excellent in the infilling property, the oil absorbing capability, the electrical characteristics, the optical characteristics, and the physical characteristics, and therefore the sol can be used as a component of an additive to paints, an additive to resins, a component of an ink-adsorbing layer, a component of cosmetics, and the like.

What is claimed is:

1. A sol of spinous inorganic oxide particles comprising:
   a solvent, and
   spinous inorganic oxide particles comprising spherical core particles and verrucous projections formed of a material containing silica on surfaces of the spherical core particles, the spinous inorganic oxide particles being dispersed in the solvent, and having
   a) a sphericity in a range from 0.8 to 1,
   b) a surface roughness SA1/SA2 in a range from 1.20 to 1.70, wherein SA1 indicates a specific surface area measured by the Sears method or the BET method and SA2 indicates a specific surface area converted from an average diameter (D2) measured by the image analysis method, and
   c) the average particle diameter (D2) measured by the image analysis method in a range from 12 to 40 nm, wherein the spinous inorganic oxide particles satisfy the following conditions:
   d) number of coarse particles with diameter of 800 nm or more is 1500 particles/mL (converted to 1% by weight of solid phase concentration) or below, and
   e) a coefficient of variation (CV value) is 7.0% or below, wherein the solvent is water, a zeta potential of the spinous inorganic oxide particles has a negative value when pH of the sol of spinous inorganic oxide particles is in the range from 4 to 6, and an absolute value of the zeta potential is 25 mV or more.

2. The sol of spinous inorganic oxide particles according to claim 1, wherein the spinous inorganic oxide particles comprise silica, silica-alumina, silica-zirconia, silica-ceria, silica-titania, or composites thereof.

3. The sol of spinous inorganic oxide particles according to claim 1, wherein the spherical core particles are selected from silica particles, alumina particles, zirconia particles, ceria particles, or composite particles thereof.

4. The sol of spinous inorganic oxide particles according to claim 1, wherein the verrucous projections increase specific surface area of the particles and provide reaction sites adapted for reaction with materials dispersed in liquids.

5. The sol of spinous inorganic oxide particles according to claim 1, wherein the verrucous projections are adapted to promote aggregation or deposition of lees in fermented liquid food.

6. The sol of spinous inorganic oxide particles according to claim 1, wherein materials dispersed in the solvent comprise protein matter.

* * * * *